March 8, 1938. H. DEUTSCH 2,110,502
AUTOMATIC CONTROL DEVICE FOR THE OVERFLOW VALVE OF INJECTORS
Filed April 1, 1937
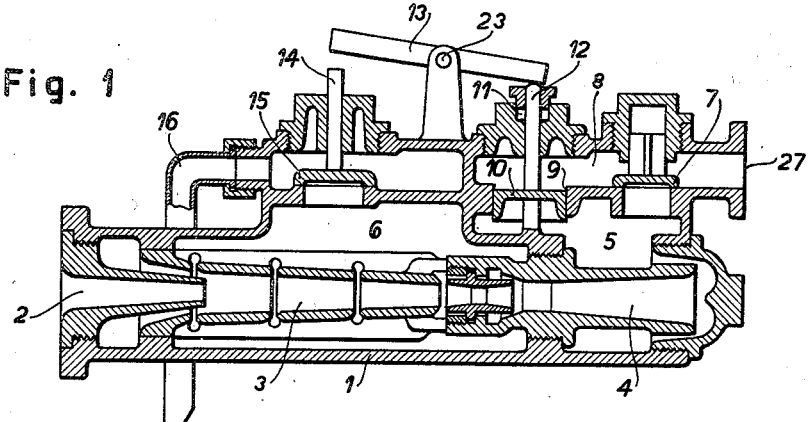
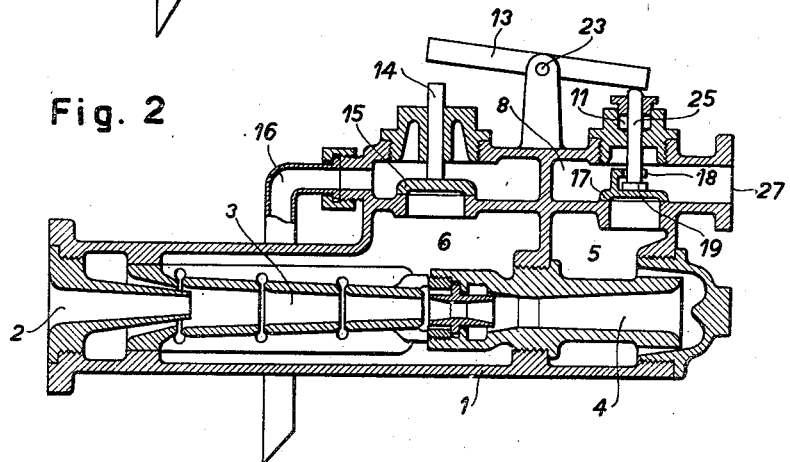
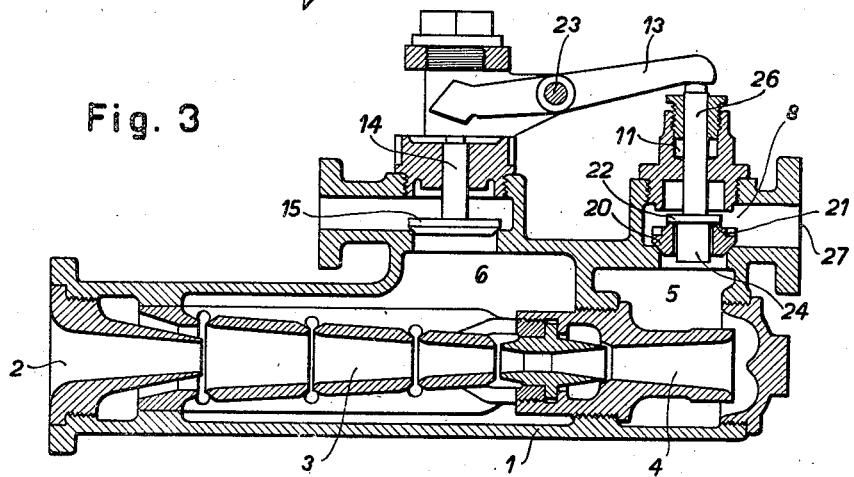

Patented Mar. 8, 1938

2,110,502

UNITED STATES PATENT OFFICE 2,110,502

AUTOMATIC CONTROL DEVICE FOR THE OVERFLOW VALVE OF INJECTORS

Hans Deutsch, Vienna, Austria, assignor to the firm Alex. Friedmann, Vienna, Austria Application April 1, 1937, Serial No. 134,430
In Austria April 8, 1936

4 Claims. (Cl. 103—275)

This invention relates to an injector and more particularly to an automatic control device for the usual overflow valve of the injector, which has for its object to positively close this valve after the injector has been started, in order to avoid losses of water or steam during the operation. Such losses may occur if the temperature of the water fed by the injector surpasses 100° C. and if at the same time the pressure prevailing in the overflow chamber exceeds the atmospheric pressure. This may happen when for example the water supplied to the injector has a relatively high temperature or when a relatively large quantity of steam is admixed to this water, as is the case in exhaust steam injectors or in high pressure injectors.

In many cases, the known control devices of the class referred to above comprise a plunger having its inner end within that chamber of the injector wherein the feed water is set under pressure. This plunger passes through a stuffing box and its outer end is operatively connected with the overflow valve so as to press this valve against its seat when the plunger is forced outwardly by the pressure of the water. When the injector is out of operation the pressure in said chamber is released and the said plunger is moved back by a spring which has to overcome the friction caused by the packing of said stuffing box, in order to release the overflow valve and to ensure that this valve can be freely lifted again at the next starting of the injector and allow the steam and water to escape already at the beginning of the operation.

If, however, the pressure of the packing of said stuffing box is relatively high, it may occur that the said spring is unable to overcome the friction caused by this packing so that the overflow valve is kept closed by the control device also after the injector has been put out of operation. This results in the disadvantage that the next starting of the injector is rendered difficult or even impossible. In this known device, it is therefore necessary that the stuffing box may not be tightened too much and is properly lubricated in order to maintain the friction exerted by the packing relatively low. It occurs, moreover, that the said plunger is held or bound in its inner position in which case undesired overflow losses are caused. Besides this, the use of a spring is objectionable insofar as in the case of breakage of the same the operation of the injector is heavily impaired.

The main object of this invention is to provide an automatic control device for the overflow valve, which avoids a spring for returning the said plunger and which secures the required movements of this plunger in any case and independently of the degree of friction exerted by the said stuffing box. A further object of the present invention is to provide a control device of the class described, which is simple in construction and reliable in operation. Further objects and advantages of the invention will result from the following detailed description.

The Figs. 1, 2, and 3 of the accompanying drawing show three different embodiments of the present invention in longitudinal sections by way of example.

As shown in Fig. 1, within the housing 1 of the injector there are arranged the steam nozzle 2, the combining nozzle 3 and the delivery nozzle 4. 5 denotes the pressure chamber communicating with the outlet of the delivery nozzle 4 and separated from the overflow chamber 6. The water is fed from the pressure chamber 5 through the check-valve 7 into the chamber 8 adjacent to the water discharge opening 27 wherefrom the water is discharged through a feed water pipe (not shown) into the boiler. Between the chambers 5 and 8 is provided an opening 9 occupied and closed by a vertically slidable piston 10. A piston rod or plunger 12 connected to the piston 10 passes upwards through a stuffing box 11 and its upper end cooperated with a lever 13 rotatably mounted at 23, the opposite end of this lever cooperating with the stem 14 of the overflow valve 15 adapted to shut off the overflow chamber 6 from the overflow discharge pipe 16.

After the injector has been started the piston 10 together with the plunger 12 is raised from the position indicated in the drawing by the pressure arising in the chambers 5 and 8 so that the lever 13 is swung in an anti-clockwise direction and the left-hand end of this lever strikes against the stem 14 of the overflow valve 15 and presses the latter down against its seat. By this means the overflow valve 15 is positively held in its closed position during the operation of the injector. Now, when the injector is put out of operation the pressure is released in the chamber 5, whereas in the chamber 8 which is now separated from the chamber 5 by the closed check valve 7 the pressure is still maintained, this pressure prevailing in the chamber 8 and in the feed water pipe connected to the opening 27 between the check-valve 7 and the feeding valve of the boiler (not shown). The difference between the pressures now existing in the chambers 8 and 5 acts upon the upper side of the piston 10 and presses the same down with relatively strong power so that the downwardly directed stroke of the plunger 12 is secured in any case, even if the friction exerted by the packing of the stuffing box 11 to the plunger 12 is very high. By this means the overflow valve 15 is immediately released so that it is allowed to freely rise at the next starting of the injector.

In the modification shown in Fig. 2 the construction and operation of the control device is similar to that of the example described above. The difference consists in that the opening 9 and piston 10 are dispensed with, the overflow valve 15 being directly controlled by the check-valve 17 arranged between the chambers 5 and 8. This valve 17 is provided with a fork 18 embracing the rod or plunger 25 immediately above a collar 19 secured thereon. When the injector is started the valve 17 lifts the plunger 25 and the overflow valve 15 is pressed down on its seat by the lever 13. When the injector is set out of operation the pressure prevailing in the chamber 8 presses down the check-valve 17 and the overflow valve 15 is released again.

Fig. 3 shows a particularly favourable embodiment of the present invention in which the check-valve 20 arranged between the chambers 5 and 8 has an annular form and is provided at its upper side with a joint surface 21 upon which may rest a collar 22 on the rod or plunger 26 which in turn cooperates with a lever 13 rotatably mounted at 23. The plunger 26 is provided below the collar 22 with a projection 24 having a larger diameter than the plunger 26 and projecting downwards into the interior of the annular valve 20 to such an extent that this projection engages the annular valve 20, whatever the position of this valve 20 and of the projection 24 may be so that the annular valve 20 is loosely guided in a vertical direction by the projection 24 in any position.

When the injector is started the feeding pressure arising in the pressure chamber 5 lifts the annular valve 20, as well as the projection 24 whereby the water is allowed to pass from the chamber 5 into the chamber 8 and from the latter to the boiler. The plunger 26 thus lifted acts upon the lever 13 which presses the overflow valve 15 down in the described manner. After the injector has been set out of operation the pressure is released in the chamber 5 and the pressure still prevailing in the chamber 8 at first forces the annular valve 20 rapidly against its seat, whereas at the first moment the plunger 26 with its projection 24 remains in its lifted position. Since the projection 24 occupies substantially the whole cross-section of the interior of the annular valve 20, now the pressure existing in the chamber 8 and acting upon the upper side and lower side of the collar 22 results, owing to the difference between the cross-sections of the plunger 26 and of the projection 24, in a downwardly directed force which moves the plunger 26 downwards into the position indicated in the drawing, thus releasing the overflow valve 15 again.

What I claim is:—

1. In an injector an automatic control device for the overflow valve of the injector, comprising a chamber directly communicating with the outlet of the delivery nozzle of the injector, another chamber communicating with the water discharge opening of the injector, a movable control member arranged between said both chambers and responsive to the pressures prevailing in both chambers, and mechanical means to transmit movement of said control member to the overflow valve.

2. In an injector an automatic control device for the overflow valve of the injector, comprising a chamber directly communicating with the outlet of the delivery nozzle, another chamber adjacent to the water discharge opening of the injector, a control piston slidably arranged between both chambers so that one side of this piston is exposed to the pressure prevailing in one of said chambers and the other side to the pressure in the other chamber, a check-valve arranged between said both chambers so as to allow the water to flow from the first named chamber into the last named chamber and transmitting means to operatively connect said piston with the overflow valve of the injector so as to press the overflow valve against its seat when said control piston is moved towards said last named chamber.

3. In an injector an automatic control device for the overflow valve of the injector, comprising a chamber directly communicating with the outlet of the delivery nozzle, another chamber communicating with the water discharge opening of the injector, a check-valve arranged between said both chambers and opening into the last named chamber, and mechanical means to transmit movement of said check-valve to the overflow valve so as to press the overflow valve against its seat when said check-valve is lifted.

4. In an injector an automatic control device for the overflow valve of the injector, comprising a chamber directly communicating with the outlet of the delivery nozzle, another chamber communicating with the water discharge opening of the injector, an annular check-valve arranged between said both chambers and opening into said last named chamber, a rod slidably projecting through an opening in the wall of the last named chamber, this passage opening being tightly closed by the said rod, a collar at the inner end of said rod adapted to tightly rest on the upper side of said annular check-valve, a projection at the lower side of said collar, said projection being of larger diameter than said rod and projecting into the interior of said annular check valve, and transmitting means to operatively connect said rod with the overflow valve so as to press the latter against its seat when said rod is lifted.

HANS DEUTSCH.